Sept. 18, 1951         W. A. RINGLER         2,568,170
ONE-PIECE LINED BOX
Filed May 18, 1946                                    2 Sheets—Sheet 2
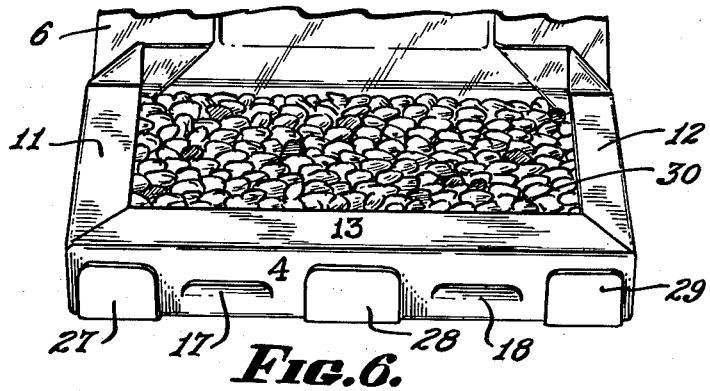
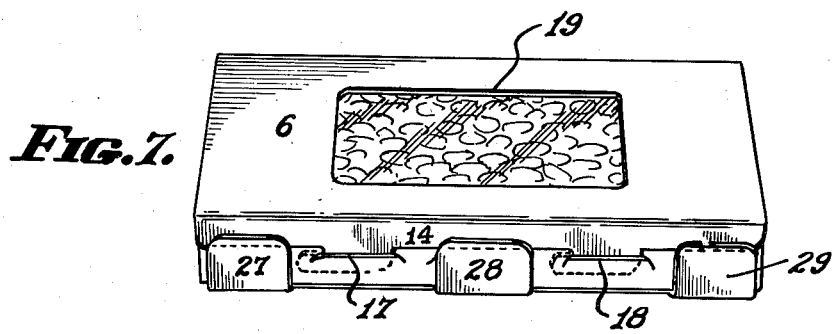
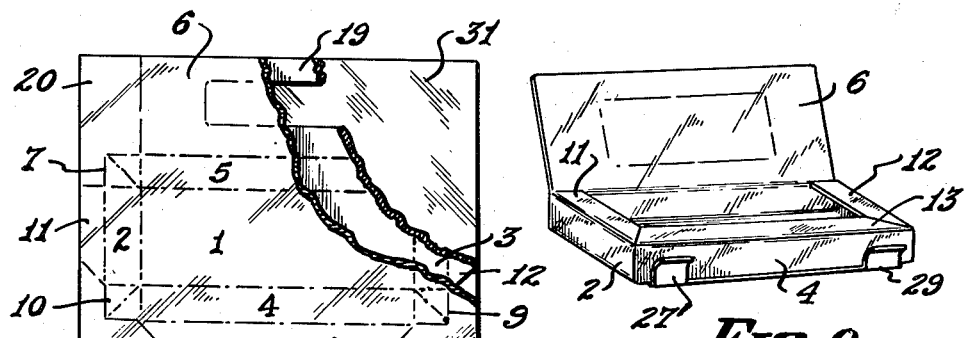
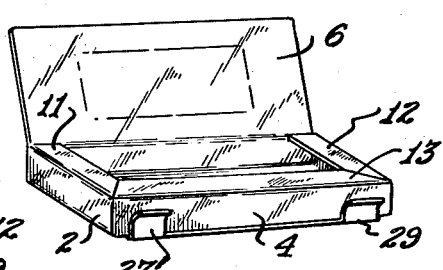
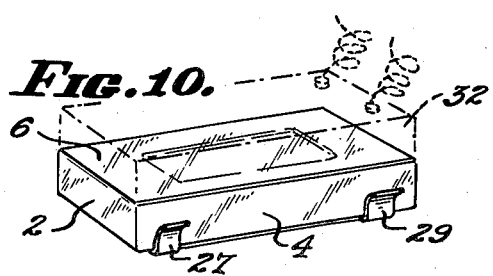
INVENTOR.
WILLIAM A. RINGLER.
BY
ATTORNEYS.

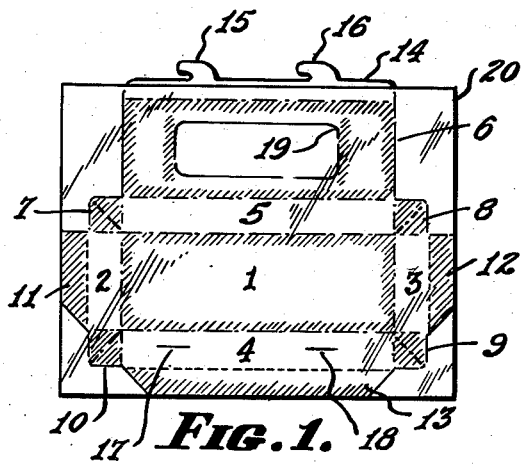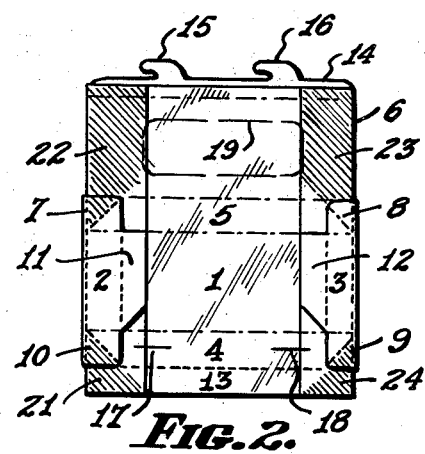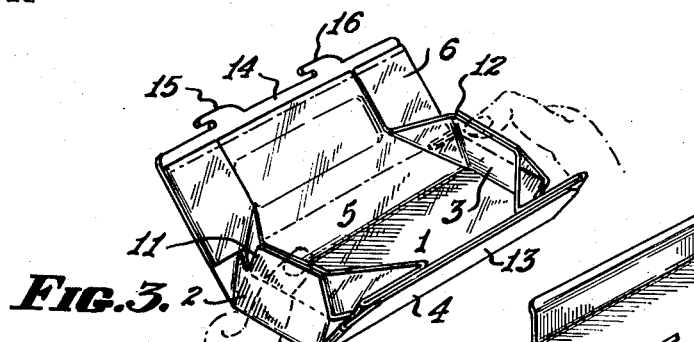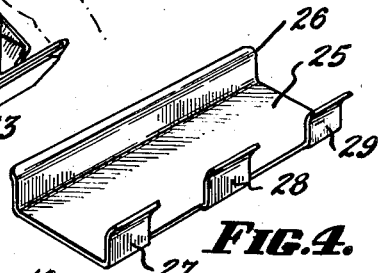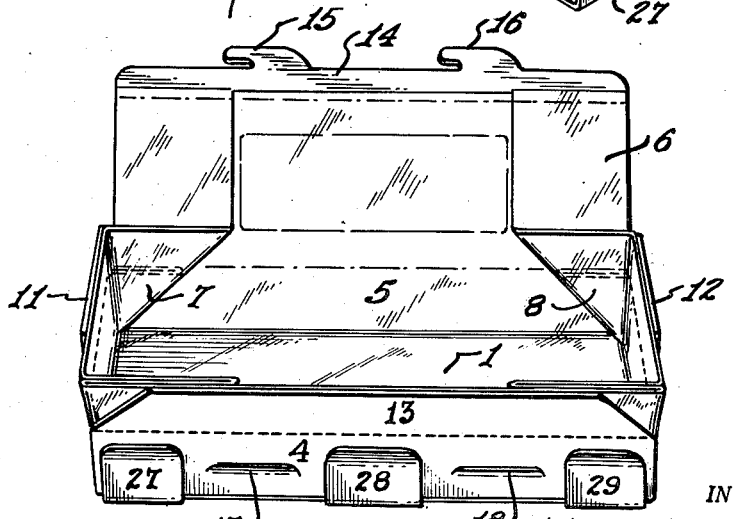

Patented Sept. 18, 1951

2,568,170

UNITED STATES PATENT OFFICE 2,568,170

ONE-PIECE LINED BOX

William A. Ringler, Wayne, Pa., assignor to The Gardner Board and Carton Co., a corporation of Ohio Application May 18, 1946, Serial No. 670,799

12 Claims. (Cl. 229—14)

The principal object of my invention is the provision of a simpler, less expensive, and more easily handled box of lined character, such as may be employed for frozen foods, by way of example.

It is my object to simplify and cheapen the manufacture of lined boxes, including the step of associating a liner element with a box blank.

It is my object to provide a type of construction in which a paperboard box blank and a liner element are not only pre-associated, but in which the liner element becomes an integral structural part of the box, holding various parts together, as well as assisting in the setting up operation by causing boxboard elements to fold with respect to each other.

It is my object to provide a lined box which may be shipped in flat or knocked down condition, and which may easily be erected, filled and closed by hand operations, where desired, but is also susceptible of being handled by mechanism.

It is an object of my invention to provide a box which may be tightly closed so as to afford adequate protection to the contents, and which may be sealed, as hereinafter taught, if desired.

It is my object to provide a box having the qualities set forth which may also have the advantage of a covered window through which the contents may be observed, and in this connection to reduce the cost of manufacture of such boxes.

These and other objects of the invention which will be set forth hereinafter or will be apparent to one skilled in the art upon reading these specifications, I accomplish in that procedure and in that construction and arrangement of parts of which I shall now describe certain exemplary embodiments. Reference is made to the accompanying drawings, wherein:

Figure 1 is a plan view of the paperboard blank for one form of my box, showing also how a liner sheet is associated therewith.

Figure 2 is a plan view of a box with the end wall members folded in, and is illustrative of the form in which the knocked-down structure is shipped to the user or packer.

Figure 3 is a perspective view showing a step in the operation of erecting the box.

Figure 4 is a perspective view of a jig which may be used to hold the erected box during filling and closing.

Figure 5 is a perspective view showing the erected box in the jig.

Figure 6 is a similar view showing the box in filled condition.

Figure 7 is a similar view showing the filled box in closed condition.

Figure 8 is a plan view showing a modified blank, with both sides of which a liner sheet has been associated.

Figure 9 shows a box formed from the blank of Figure 8 in erected condition and held in a jig.

Figure 10 is a similar perspective view illustrative of a mode of sealing the box.

Referring to Figure 1, it will be seen that I have provided a paperboard blank having a bottom wall 1 to the ends of which are articulated end wall members 2 and 3. Side wall members 4 and 5 are articulated to the sides of the bottom wall. A cover panel 6 is articulated to the side wall 5.

Bellows-folding portions 7, 8, 9 and 10 connect respectively the ends of the side and end walls, and these portions are diagonally scored as shown.

The two end walls 2 and 3 carry flanges 11 and 12; and a flange 13 is borne by the side wall 4. The meeting corners of these flanges are preferably cut away diagonally as shown.

The cover panel 6 may carry a flange 14 provided with locking tongues 15 and 16, there being corresponding locking slits 17 and 18 in the side wall 4. The cover wall 6 may be provided with a window opening 19 where desired.

The blank is made from paperboard in the usual way by cutting and scoring. It may be printed upon its outer surface. The next step in the manufacture of my box is the association of a liner sheet 20 with the inside surface of the blank. The liner sheet is approximately the full size of the rectangle in which the blank would fit, as will be apparent from Figure 1. Preferably, it should not extend into the area of the locking tongues 15 and 16, but it should be as large as the blank in every other direction and may be larger. Thus I have no problem of spotting and accurately locating a smaller sheet of flexible material on a blank of larger dimensions, nor do I require the conventional apparatus for this purpose. My blanks, on the contrary, may be passed individually through a simple machine in which adhesive for the liner sheet is applied to the blanks in the areas shaded in Figure 1, the blanks moving, say, in the direction of the length of the side walls, whereupon a continuous length of the liner material may be brought against the blanks. When the adhesive has set, the blanks may be separated by cutting the liner material between the blanks. Other modes of association using individual sheets of the liner material may be employed.

It will be noted in Figure 1 that the liner is adhered to the bottom wall 1, the corner connecting portions 7, 8, 9 and 10, the flange members 11, 12 and 13, and to the cover panel 6. Elsewhere the liner may be left free of the blank.

The liner may be of any suitable, flexible sheet material. It will usually be chosen or made in view of desired requirements for proofness. Thus I may select glassine or parchment, or various forms of paper, or I may select any of the non-fibrous films of commerce, or a laminated metal foil, or the like. In the further formation of my box it will be necessary to adhere parts of the liner to each other, and while this may be done with an application of adhesive, it is convenient to do so by heat sealing alone. Some non-fibrous films possess the inherent property of heat-sealability. Other materials may be precoated with a heat-sealable thermoplastic. Ordinary "moisture-proof" cellophane has such a coating and is heat-sealable to itself, for which reason it serves my purpose very well.

The next step in the formation of my box is to fold the end walls, the connecting portions, and the end wall flanges inwardly as indicated in Figure 2, along the score lines separating the end walls from the bottom wall. The liner sheet is, of course, concurrently folded. The folding may be accomplished in any standard carton folding and gluing machine; and if adhesive is to be applied, it may be done by spot gluing equipment arranged on such a machine. If, however, as I prefer, the adhesive unions next to be described are to be produced by the heat sealing of a liner sheet having such characteristics, adhesive will not be applied, but the machine may be equipped with heating devices timed to accomplish the unions. These operations may also be performed by hand if desired. In any event, following the described folding, I produce adhesive unions in the areas shaded in Figure 2 and marked with the numerals 21, 22, 23 and 24. It will be noted that one triangular half of each corner bellows-folding portion is adhered to an end of the side walls 4 and 5, through the liner sheet, and that beyond these areas the folded portions of the liner sheet are adhered together in the aforesaid areas bounded on one end by a prolongation of the diagonal score lines.

The structure shown in Figure 2 is the knocked-down form of my box, and is the form in which it is shipped to the box user.

As will be seen from Figure 3, my box is very easily erectable either by hand or by machine. It is necessary only to pull upwardly on the end wall flanges 11 and 12. This erects the end walls 2 and 3, and the coaction of the bellows-folding corner portions and the adhered and unadhered portions of the liner results in the erection of the side walls 4 and 5.

The erected structure is then conveniently placed in some sort of holder or jig which will maintain the erected form of a box during the operation of filling. I have shown such a jig in Figure 4 as a sheet metal structure having a base 25, a back wall 26, and a front wall which for the blank of Figure 1 is divided into spaced sections 27, 28 and 29. The erected box is shown engaged in the jig in Figure 5.

When the desired contents 30 have been loaded into the box, the end and side wall flanges 11, 12 and 13 are folded over inwardly as shown in Figure 6, and the box may be closed by swinging the top panel 6 downwardly. By bending over the flange 14 against the side wall 4 and by engaging the locking tongues 15 and 16 in the slots 17 and 18, a secure closure may be obtained, as illustrated in Figure 7. The liner sheet has been left unadhered to the wall 4, so that this locking may be accomplished without disturbance or perforation of the liner. The liner is continuous throughout the entire body of the box, as will be clear, so that my structure is well adapted for the holding of contents which are moist or contain liquids.

It is also possible to heat-seal the box. This may be accomplished by means of adhesive applied to the outer side of the boxboard in the areas of the end and side wall flaps 11, 12 and 13. Such adhesive may be applied to the flanges when the box is in the condition shown in Figure 6. It may also be pre-applied to the blank. Yet again it may be applied to marginal portions of the cover panel, either before or after the erection of the box. By these means the cover panel may be adhered to the end and side wall flanges; and in such a box the flange 14 on the cover, the locking tongues 15 and 16, and the slits 17 and 18 may be omitted.

In Figure 8 I have illustrated a blank without the flange, tongues and slits. The remaining parts are similar to those in Figure 1, and like parts have been given like index numerals. A sheet 20 of liner material has not only been associated with the inside surface of the blank, but a sheet 31 has been associated with the outer surface of the blank in like manner or preferably by overall adhesion. This structure will be folded and adhered as has been described in Figure 2. It can be erected, placed in a jig, and filled in a similar fashion. The use of the heat-sealable liner sheets on both sides of the blank not only gives added protection to the contents, but when the box has been brought to the condition shown in Figure 9, it enables me to swing the cover panel 6 down against the end and side wall flanges 11, 12 and 13, and then seal the cover to these flanges, as by a heated member 32 indicated in dotted lines in Figure 10. For example, if both sides of the blank have been covered with moisture-proof cellophane, my box may readily be sealed shut in the fashion just described, the seal being to all intents and purposes an hermetic seal and being of sufficient strength to hold the box closed in spite of the strains of handling and shipment.

Modifications may be made in my invention without departing from the spirit of it; and it will be evident that the size and specific shape of the illustrated box forms no limitation herein. Having thus described my invention in an exemplary embodiment, what I claim as new and desire to secure by Letters Patent is:

1. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, and a liner in the form of a sheet of flexible material extending freely beyond said bellows-folding members in at least one direction, and adhered to said blank at least within the areas of said top and bottom wall panels and said bellows-folding portions, said end wall members and one of said side wall members having articulated flanges to fold over contents in the erected box, said flanges bearing on their outer surfaces a thermoplastically sealable substance whereby said cover panel may be adhered to said flanges in the erected box.

2. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, and a liner in the form of a sheet of flexible material covering said blank and extending freely beyond said bellows-folding members in at least one direction, and adhered to said blank at least within the areas of said top and bottom wall panels and said bellows-folding portions, and having said end wall panels and portions of said liner lying beyond the ends of said bottom wall panel in infolded condition, the lapping portions of the liner being adhesively secured to each other only in areas lying off the ends of said end wall panels and including half each of the bellows-folding portions, whereby when said end walls are raised, the result of the combined action of the liner and the blank will be to erect the side walls with respect to the bottom of the said box.

3. The structure claimed in claim 2 in which a window opening is formed in said top panel and is covered by said liner sheet which is of transparent character.

4. A process of producing packages which comprises providing a paperboard blank having a bottom panel, side and end walls articulated thereto, bellows-folding corner connections articulated to the ends respectively of the side and end walls, a top panel articulated to one of the side walls and flanges upon the other side wall and said end walls, associating a liner sheet with said blank so as to cover all of the named parts and adhering said liner sheet at least to said top and bottom panels, said corner connecting portions and said flanges, folding said blank and liner on lines of articulation adjacent the ends of the body panel, adhering lapping portions of said liner together in areas off the ends of said end walls and including half portions of said bellows-folding portions, erecting the knocked-down structure so formed by pulling upwardly on said end wall flanges whereby side and end walls are erected with respect to said bottom panel, placing the erected structure in a jig to hold it in erected condition, filling it, folding said flanges inwardly, swinging downwardly and securing said top panel to close the box, and removing the filled and closed box from said jig.

5. The process claimed in claim 4 in which said top panel has a flange and means for engaging and locking with one of said side walls, and in which said jig has portions cut away to permit said locking prior to the removal of the filled and closed package from said jig.

6. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, said end wall members and one of said side wall members having articulated flanges to fold over contents of the erected box, and a liner in the form of a sheet of flexible material extending laterally to the outer edges of said end flanges and freely beyond said bellows-folding members at least to the outer edges of said end wall flanges, the outer edge of said side wall flange and the outer edge of said cover panel, said liner being adhered to said blank at least within the areas of said bellows-folding portions and said flanges.

7. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, and a liner in the form of a sheet of flexible material extending freely beyond said bellows-folding members in at least one direction, and adhered to said blank at least within the areas of said top and bottom wall panels and said bellows-folding portions, said end wall members and one of said side wall members having articulated flanges to fold over contents in the erected box, there being a second liner sheet covering the opposite surface of said paperboard blank, said liners both having the property of heat sealability, said end wall members, their flanges, and the adjacent bellows-folding portions being infolded along lines of fold adjacent the ends of said bottom panel, said liner sheets being similarly folded, and lapping portions of said liner sheets being adhered together in areas lying off the ends of said end wall panels and including a half portion each of said bellows folding portions, whereby when said end wall members and their flanges are raised, the side wall members will be erected with respect to the bottom panel, said last mentioned liner sheet serving as means whereby said cover panel may be adhered to said flanges when said flanges are turned inwardly over the contents of the erected box.

8. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, and a liner in the form of a sheet of flexible material covering said blank and extending freely beyond said bellows-folding members in at least one direction, and adhered to said blank at least within the areas of said top and bottom wall panels and said bellows-folding portions, and having said end wall panels and portions of said liner lying beyond the ends of said bottom wall panel in infolded condition, the lapping portions of the liner being adhesively secured to each other only in areas lying off the ends of said end wall panels and including half each of the bellows-folding portions, whereby when said end walls are raised, the result of the combined action of the liner and the blank will be to erect the side walls with respect to the bottom of the said box, said liner sheet being heat sealable and said last mentioned adhesive union being of a heat sealable type in which lapping portions of said liner are joined to each other.

9. A box comprising a paperboard blank cut and scored to present a bottom wall panel, end wall members articulated to the ends of said bottom wall panel, side wall members articulated to the sides of said bottom wall panel, a top panel articulated to a side wall member, and diagonally scored corner portions lying between the ends of said end and side wall members and articulated to each, and a liner in the form of a sheet of flexible material covering said blank and extending freely beyond said corner portions in two directions, said liner being adhered to said blank at least within the areas of said top and bottom wall panels and said corner portions, said end wall panels and portions of said liner lying beyond the end of said bottom panel being in infolded condition, with lapping portions of said liner lying beyond said diagonal score lines and their prolongations adhesively secured to each other, whereby when said end walls are erected, the lapped portions of the liner will coact with the blank to erect the side walls and top panel with respect to the bottom of said box.

10. The structure claimed in claim 9 in which the liner sheet is heat sealable and the adhesive union between lapped portions of the liner is of a heat sealable nature.

11. The structure claimed in claim 10 in which said end walls and one of said side walls have articulated flanges to fold over contents placed in the erected box, and said cover panel having a flange with means engaging said last mentioned side wall member, said flanges bearing on the outer surfaces a thermoplastically sealable substance whereby said cover panel may be adhered to said flanges in the erected box.

12. A box comprising a paperboard blank cut and scored to present a bottom panel, end wall members articulated to the ends of said bottom wall panel, side wall members articulated to the sides of said bottom wall panel, a top panel articulated to a side wall member, and bellows-folding members lying between the ends of said end and side wall members and articulated to each, and a liner in the form of a sheet of flexible material covering said blank and extending freely beyond said bellows-folding members in at least one direction, and adhered to said blank at least within the areas of said top and bottom wall panels and said bellows-folding portions, and having said end wall panels and portions of said liner lying beyond the ends of said bottom wall panel in infolded condition, the lapping portions of the liner being adhesively secured to each other only in areas lying off the ends of said end wall panels and including half each of the bellows-folding portions, whereby when said end walls are raised, the result of the combined action of the liner and the blank will be to erect the side walls with respect to the bottom of the said box, said liner sheet being heat sealable and said last mentioned adhesive union being of a heat sealable type in which lapping portions of said liner are joined to each other, said end walls and one of said side walls having articulated flanges to fold over contents placed in the erected box, and said cover panel having a flange with locking means engaging said last mentioned side wall member.

WILLIAM A. RINGLER.

REFERENCES CITED

The following references are of record in the file of this patent:

UNITED STATES PATENTS

| Number | Name | Date |
|---|---|---|
| 413,784 | Hotchkiss | Oct. 29, 1889 |
| 1,174,605 | Palmer | Mar. 7, 1916 |
| 1,927,435 | Derst | Sept. 19, 1933 |
| 1,965,769 | Kraft | July 10, 1934 |
| 2,048,729 | Daller | July 28, 1936 |
| 2,073,272 | Wellman | Mar. 9, 1937 |
| 2,097,708 | Trost | Nov. 2, 1937 |
| 2,430,610 | Guyer | Nov. 11, 1947 |

FOREIGN PATENTS

| Number | Country | Date |
|---|---|---|
| 490,316 | Great Britain | Aug. 12, 1938 |